(12) United States Patent
Lan et al.

(10) Patent No.: US 9,903,567 B2
(45) Date of Patent: Feb. 27, 2018

(54) MECHANISM FOR MOUNTING LENS MODULE THEREON

(71) Applicant: GLUX VISUAL EFFECTS TECH (SHENZHEN) CO., LTD., Shenzhen (CN)

(72) Inventors: Xia Lan, Shenzhen (CN); Ming Lan, Shenzhen (CN); Yuancai Xu, Shenzhen (CN)

(73) Assignee: GLUX VISUAL EFFECTS TECH (SHENZHEN) CO., LTD., Shenzhen, Guangdong (CN)

( * ) Notice: Subject to any disclaimer, the term of this patent is extended or adjusted under 35 U.S.C. 154(b) by 131 days.

(21) Appl. No.: 14/900,888

(22) PCT Filed: Jul. 2, 2015

(86) PCT No.: PCT/CN2015/083167
§ 371 (c)(1),
(2) Date: Dec. 22, 2015

(87) PCT Pub. No.: WO2016/101584
PCT Pub. Date: Jun. 30, 2016

(65) Prior Publication Data
US 2016/0369980 A1    Dec. 22, 2016

(30) Foreign Application Priority Data

Dec. 24, 2014  (CN) .......................... 2014 1 0817774

(51) Int. Cl.
*F21V 17/02*   (2006.01)
*G09F 9/33*    (2006.01)
(Continued)

(52) U.S. Cl.
CPC ............ *F21V 17/02* (2013.01); *G09F 9/3026* (2013.01); *G09F 9/33* (2013.01); *H05K 5/02* (2013.01); *B23P 19/04* (2013.01); *F21Y 2115/10* (2016.08)

(58) Field of Classification Search
CPC .............. F21Y 2115/10; F21Y 2101/02; F21Y 2105/16; F21V 19/02; F21V 17/02; F21V 21/14; F21S 2/005; B23P 19/04
See application file for complete search history.

(56) References Cited

U.S. PATENT DOCUMENTS

| 9,564,070 B2* | 2/2017 | Nall ........................ G09F 13/04 |
| 2013/0265765 A1 | 10/2013 | Liang et al. |
| 2016/0223184 A1* | 8/2016 | Ohno .................... F21V 29/767 |

FOREIGN PATENT DOCUMENTS

| CN | 201163492 | 12/2008 |
| CN | 202444712 | 9/2012 |

(Continued)

*Primary Examiner* — Robert May
(74) *Attorney, Agent, or Firm* — Hamre, Schumann, Mueller & Larson, P.C.

(57) ABSTRACT

The present application discloses an LED module mounting mechanism which comprises a fixing frame (2), at least one gap adjusting mechanism mounted on the fixing frame (2), and at least two moving blocks (3) movably connected with the fixing frame (2). The LED modules (100) are arranged on the moving blocks (3). Two ends of the gap adjusting mechanism are connected with the moving blocks (3) respectively. A gap between the LED modules (100) arranged on the moving blocks (3) is adjusted by moving the moving blocks (3) on the two ends toward or away from each other. The present application belongs to the technical field of LED modules and LED display screens. The LED module mounting mechanism solves the technical problems in the prior art that the method for adjusting the planar gap between the LED modules is complex and unstable, and (Continued)

adjusting the planeness which is perpendicular to the planar direction of the LED modules can't be achieve. The LED module mounting mechanism is particularly applicable to adjusting the planeness perpendicular to the direction of the LED modules and the planar gap between the LED modules, the adjusting operation is simple, and the adjusting effect is stable.

11 Claims, 17 Drawing Sheets

(51) Int. Cl.
*H05K 5/02* (2006.01)
*G09F 9/302* (2006.01)
*B23P 19/04* (2006.01)
*F21Y 115/10* (2016.01)

(56) References Cited

FOREIGN PATENT DOCUMENTS

| CN | 103124483 | 5/2013 |
|----|-----------|--------|
| CN | 203390803 | 1/2014 |
| CN | 203799606 | 8/2014 |
| CN | 104723074 | 6/2015 |

\* cited by examiner

MECHANISM FOR MOUNTING LENS MODULE THEREON

TECHNICAL FIELD

The present application relates to the field of LED modules, and more particularly, to an LED module mounting mechanism.

BACKGROUND

Currently, in a variety of indoor and outdoor activities, LED display screens are often used for advertising, stage layout and the like. People have higher and higher demands for display effect of the LED display screens. A current widely used large-scale LED display screen is formed by assembling a plurality of LED modules through an LED module mounting mechanism. Since inevitably gaps between the LED modules and uneven surface can't be avoided in the assembly process, and a conventional LED module mounting mechanism generally can not adjust gaps between the LED modules and the flatness of the LED module, the whole LED display resolution and display effect will be affected.

After years of development, the pixels of LED display are more and more closer, but even high-precision machining and excellent assembly process is used, it is unable to achieve a complete seamless splicing when using a conventional LED module mounting mechanism, and it often needs to manually add a material for adjustment, which may be very time consuming.

An existing adjustable LED display structure, as shown in FIG. 1, includes a frame and an LED display assembly mounted on the frame. The frame comprises two cross bars 110 arranged in parallel and a plurality of connecting rods 120 connected between the two cross bars 110 and movable along the longitudinal direction of the cross bars 110. The LED display assembly is assembled from a plurality of LED modules 150. The assembling position of the LED module 150 is fixedly provided with a magnetic member 151 for attracting the connecting rod 120. The adjustable LED display structure adjusts the gap in the X-axis direction by moving the connecting rod 120 in cross bars 110 and adjusts the gap in the Y-axis direction by using the magnetic member 151 of the LED module 150 to attract the connecting rod 120. The adjusting way is complicated, the magnetic attracting mode is also prone to make the gap between LED modules instable and easy to change, and the adjustment of the gaps or the flatness along the Z-axis direction that is perpendicular to the plane of the LED module can't be achieved. Adjustment of the gaps in the X-axis and Y-axis directions directly affects watching effect for the front audience. If the gaps in the X-axis and Y-axis are unreasonable, the audience in the view angle of 60 degrees can clearly see a bright line or black line between the screens. The adjustment of gaps in the Z-axis directly affects the viewing effect for the audience sitting on the side. If the Z-axis planeness is unreasonable, there will be a height difference between screens viewed from the side, and the audience sitting on the side can see the black line between the screens or non-continuous images.

SUMMARY

The invention aims at solving the problem existing in the prior art that the method for adjusting the planar gap of the LED module is complicated and instable and the adjustment of the planeness perpendicular to the direction of the plane of the LED modules can't be achieved, and provides an LED module mounting mechanism of which the adjusting operation is simple, the adjusting effect is stable and which can adjust the planeness perpendicular to the direction of the LED modules and also the planar gap between the LED modules.

To solve the technical problem mentioned above, the LED module mounting mechanism of the present invention comprises: a fixing frame, at least one gap adjusting mechanism mounted on the fixing frame, and at least two moving blocks movably connected with the fixing frame, wherein the LED modules are arranged on the moving blocks; two ends of the gap adjusting mechanism are connected with the moving blocks respectively; a gap between the LED modules arranged on the moving blocks is adjusted by moving the moving blocks on the two ends toward or away from each other. In the LED module mounting mechanism of the present invention:

the fixing frame show a cross pattern and comprises a horizontal frame and a vertical frame, an extending direction of the horizontal frame is defined as an X-axis direction and the extending direction of the vertical frame is defined as a Y-axis direction.

there are four moving blocks respectively disposed on two sides of the horizontal frame and two sides of the vertical frame, and show a grid pattern, the moving blocks disposed on the two ends of the horizontal frame are movable along the X-axis direction and the moving blocks disposed on the two ends of the vertical frame are movable along the Y-axis direction, each LED module is mounted on one movable block;

the number of the gap adjusting mechanisms is at least three, the at least three gap adjusting mechanisms are respectively mounted on the horizontal frame and the vertical frame, two ends of each gap adjusting mechanism are connected to two moving blocks respectively, the gap between two LED modules arranged on the moving blocks is adjusted by moving the two moving blocks on the two ends toward or away from each other, wherein the gap adjusting mechanism mounted on the horizontal frame is a Y-axis adjustment mechanism, the gap adjusting mechanism mounted on the vertical frame is an X-axis gap adjusting mechanism, wherein the Y-axis gap adjusting mechanism is mounted on the horizontal frame in a manner capable of integrally moving along the X-axis direction, and the X-axis gap adjusting mechanism is mounted on the vertical frame in a manner capable of integrally moving along the X-axis direction.

the horizontal frame is provided with an X-direction strip through hole extending in the longitudinal direction along the X-axis direction, the vertical frame is provided with a Y-direction strip through hole extending in the longitudinal direction along the Y-axis direction, the X-axis gap adjusting mechanism is movably disposed within the Y-direction stripe through hole and two ends of the X-axis gap adjusting mechanism extend out of the Y-direction stripe through hole and are respectively connected to left and right movable blocks, such that the two movable blocks are capable of being driven to move toward or away from each other along the X-axis direction; and the Y-axis gap adjusting mechanism is movably disposed within the X-direction stripe through hole and two ends of the Y-axis gap adjusting mechanism extend out of the X-direction stripe through hole and are respectively connected to upper and lower movable blocks, such that the two movable blocks are capable of being driven to move toward or away from each other along the Y-axis direction.

the gap adjusting mechanism is an adjusting screw of which two ends are provided with screw threads, the X-axis gap adjusting mechanism is an X-axis adjusting screw, the Y-axis gap adjusting mechanism is a Y-axis adjusting screw, a side surface of the movable block facing to the X-axis adjusting screw is provided with an X-axis screw hole adapted to be connected to the X-axis adjusting screw in a threaded connection manner, and a side surface of the movable block facing to the Y-axis adjusting screw is provided with a Y-axis screw hole adapted to be connected to the Y-axis adjusting screw in a threaded connection manner.

the X-axis adjusting screw comprises a X-axis adjusting portion and two X-axis threaded portions fixedly connected to two sides of the X-axis adjusting portion, the thread directions of the two X-axis threaded portions are opposite, the two X-axis threaded portions are respectively connected to the X-axis screw holes on two sides of the X-axis adjusting screw, the thread direction of the X-axis screw holes are matched with the corresponding X-axis threaded portion; the Y-axis adjusting screw comprises a Y-axis adjusting portion and two Y-axis threaded portions fixedly connected to two sides of the Y-axis adjusting portion, the thread directions of the two Y-axis threaded portions are opposite, the two Y-axis threaded portions are respectively connected to the Y-axis screw holes on two sides of the Y-axis adjusting screw, the thread direction of the Y-axis screw holes are matched with the corresponding Y-axis threaded portion.

the fixing frame is detachable and is formed by fastening a first fixing frame and a second fixing frame, the X-axis adjusting screw and the Y-axis adjusting screw are disposed between the first fixing frame and the second fixing frame, a part of the first fixing frame or the second fixing frame corresponding to the X-axis adjusting screw is provided an opening extending in the longitudinal direction along the Y-axis direction, and a part of the first fixing frame or the second fixing frame corresponding to the Y-axis adjusting screw is provided with an opening extending in the longitudinal direction along the X-axis direction; at least a part of the X-axis adjusting portion and at least a part of the Y-axis adjusting portion are respectively arranged in the corresponding opening, two longer opposite side walls of each opening limit the part of the X-axis adjusting portion located therein or the part of the Y-axis adjusting portion located therein to limit the X-axis adjusting portion or the Y-axis adjusting portion.

an outer circumference wall of the X-axis adjusting portion is provided a plurality of X-axis adjusting holes which are to be inserted by a tool to rotate the X-axis adjusting screw; the outer circumference wall of the Y-axis adjusting portion is provided a plurality of Y-axis adjusting holes which are to be inserted by the tool to rotate the Y-axis adjusting screw.

preferably, a surface of each of the movable blocks facing to the fixing frame is formed with at least one projection, a corresponding part of the fixing frame is provided with a recess, the projection is movably engaged in the recess.

preferably, the direction perpendicular to the plane of the LED modules mounted on the movable blocks is defined as the Z-axis direction, the LED module mounting mechanism further comprises a Z-axis adjusting mechanism mounted in the movable block, corners of the LED module is correspondingly provided with a Z-axis cooperating mechanism, the Z-axis adjusting mechanism cooperates with the Z-axis cooperating mechanism of the LED module to adjust the LED module to move toward or away from the movable block along the Z-axis direction.

a mounting hole extending along the Z-axis direction is formed on the movable block, the Z-axis adjusting mechanism is a Z-axis adjusting screw axially limited in the mounting hole, the Z-axis cooperating mechanism is a Z-axis adjusting bolt formed on corner of the LED module, the Z-axis adjusting screw is connected to the Z-axis adjusting bolt formed on corner of the LED module.

each of the movable block is provided with at least one positioning column extending in a longitudinal direction along the Z-axis direction, the corner of the LED module to be connected to the corresponding movable block is provided with at least one positioning hole adapted to be inserted by the positioning column, the positioning column is capable of being inserted into the positioning holes.

a step is formed on an inner wall of the mounting hole, an annular projection is formed on a head of the Z-axis adjusting screw adapted to be screwed by tools, a side of the annular projection abuts against the step, the other side of the annular projection is provided with a limiting block, the Z-axis adjusting screw and the limiting block are axially limited in the mounting hole by the step and the limiting block.

Compared with the prior art, the LED module mounting mechanism of the present application has the following advantages:

(1) The LED module mounting mechanism comprises a fixing frame and a gap adjusting mechanism mounted on the fixing frame, the fixing frame shows a cross pattern and comprises a horizontal frame and a vertical frame, the number of the moving blocks is four, and the four moving blocks are respectively disposed at four corners of the fixing frame, the moving blocks are movably disposed on the fixing frame, one LED module is mounted on one movable block; the number of the gap adjusting means is four, and the four gap adjusting means are respectively mounted on the horizontal frame and the vertical frame, two ends of each gap adjusting mechanism are connected to two moving blocks respectively, the gap between two LED modules arranged on two moving blocks is adjusted by moving the two moving blocks on the two ends toward or away from each other. The above LED module mounting mechanism can adjust the gaps between the LED modules, therefore the LED module mounting mechanism can be applied not only to larger dot pitch LED modules, but also to smaller dot pitch LED modules, and the application range thereof is very extensive. When the LED module performs a gap adjustment, seamless splicing can be achieved, therefore the screen shows no black line and bright line when seen in the front and does not need to be adjusted by manually adding a material, thus the adjustment effect is good, the adjustment way is simple, and the time for adjustment is saved. Moreover, compared with the existing method for adjusting the gaps between LED modules through magnetic attraction, the LED module mounting mechanism makes the gaps between the LED modules be more stable after adjustment and difficult to change automatically or due to outside interference.

(2) In the LED module mounting mechanism, the gap adjusting mechanism is an adjusting screw of which two ends are provided with screw threads, the X-axis gap adjusting mechanism is an X-axis adjusting screw, the Y-axis gap adjusting mechanism is a Y-axis adjusting screw, a side surface of the movable block facing to the X-axis adjusting screw is provided with an X-axis screw hole adapted to be connected to the X-axis adjusting screw in a threaded connection manner, and the side surface of the movable block facing to the Y-axis adjusting screw is provided with a Y-axis screw hole adapted to be connected to the Y-axis adjusting screw in a threaded connection manner. The structure of the adjusting screw and the screw hole facilitate connection and disconnection between the gap adjusting mechanism and the movable block, and threaded adjustment can control a relative movement between the gap adjusting mechanism and the movable block more accurately and more stably, such that adjustment of the gaps between the LED modules mounted on the movable block is more accurate and more stable, the adjusting method is simple, and the operation is easy.

(3) In the LED module mounting mechanism, the LED module mounting mechanism further comprises a Z-axis adjusting mechanism mounted in the movable block, the Z-axis adjusting mechanism is connected with the LED module and adjusts the LED module to move toward or away from the movable block along the Z-axis direction. The gap and the planeness in the Z-axis direction perpendicular to the plane of the LED modules may be adjusted. It can ensure that the surface of the LED module is flushed, so the LED module looks no dislocation when seen from the side, which can improve viewing effect of the audience on the side and overcome height difference between the screens which can be seen from the side and is resulted from the unreasonable Z-axis flatness, so that the audience on the side do not see black lines between screens and the screen image the or non-continuous image.

(4) In the LED module mounting mechanism, a step is formed on an inner wall of the mounting hole, an annular projection is formed on a head of the Z-axis adjusting screw adapted to be screwed by tools, a side of the annular projection abuts against the step, the other side of the annular projection is provided with a limiting block, the Z-axis adjusting screw and the limiting block are axially limited in the mounting hole through the step. Therefore the Z-axis adjusting screw can only rotate about the Z-axis and translational motion can not happen. When the Z-axis adjusting screw is adjusted, it only controls the translation of the LED module along Z-axis direction, and doesn't affect the positioning of the LED module in the X-axis and Y-axis, thereby ensuring that the LED module is mounted and positioned on the LED module mounting mechanism more accurately and more stably.

BRIEF DESCRIPTION OF THE DRAWINGS

In order to make the content of the present invention be understood more clearly, the utility model is described in detail further hereafter with reference to the accompanying drawings, wherein.

The reference numbers in drawings are: 100—LED module; 2—fixing frame; 21—horizontal frame; 22—vertical frame; 23—first fixing frame; 24—second fixing frame; 25—opening; 26—opening; 27—recess; 3—movable block; 31—projection; 32—mounting hole; 33—positioning column; 34—step; 35—X-axis screw hole; 36—Y-axis screw hole; 4—X-axis adjusting screw; 41—X-axis adjusting portion; 411—X-axis adjusting hole; 42—X-axis threaded portion; 5—Y-axis adjusting screw; 51—Y-axis adjusting portion; 511—Y-axis adjusting hole; 52—Y-axis threaded portion; 6—Z-axis adjusting screw; 61—annular projection; 7—Z-axis adjusting bolt; 8—positioning hole; 9—limiting block.

DETAILED DESCRIPTION OF THE EMBODIMENT

The following embodiments are used to illustrate the present application with reference to the accompanying drawings.

First Embodiment

Referring to FIGS. 2-5, the LED module mounting mechanism of the present application comprises fixing frame 2, at least two moving blocks 3 and at least one gap adjusting mechanism mounted on the fixing frame 2. Wherein, The fixing frame 2 may have many shapes, in this embodiment, the fixing frame 2 shows a cross ("十") patent, the fixing frame 2 comprises a horizontal frame 21 and a vertical frame 22. An extending direction of the horizontal frame 21 is defined as an X-axis direction and the extending direction of the vertical frame 22 is defined as a Y-axis direction.

Figure 6:
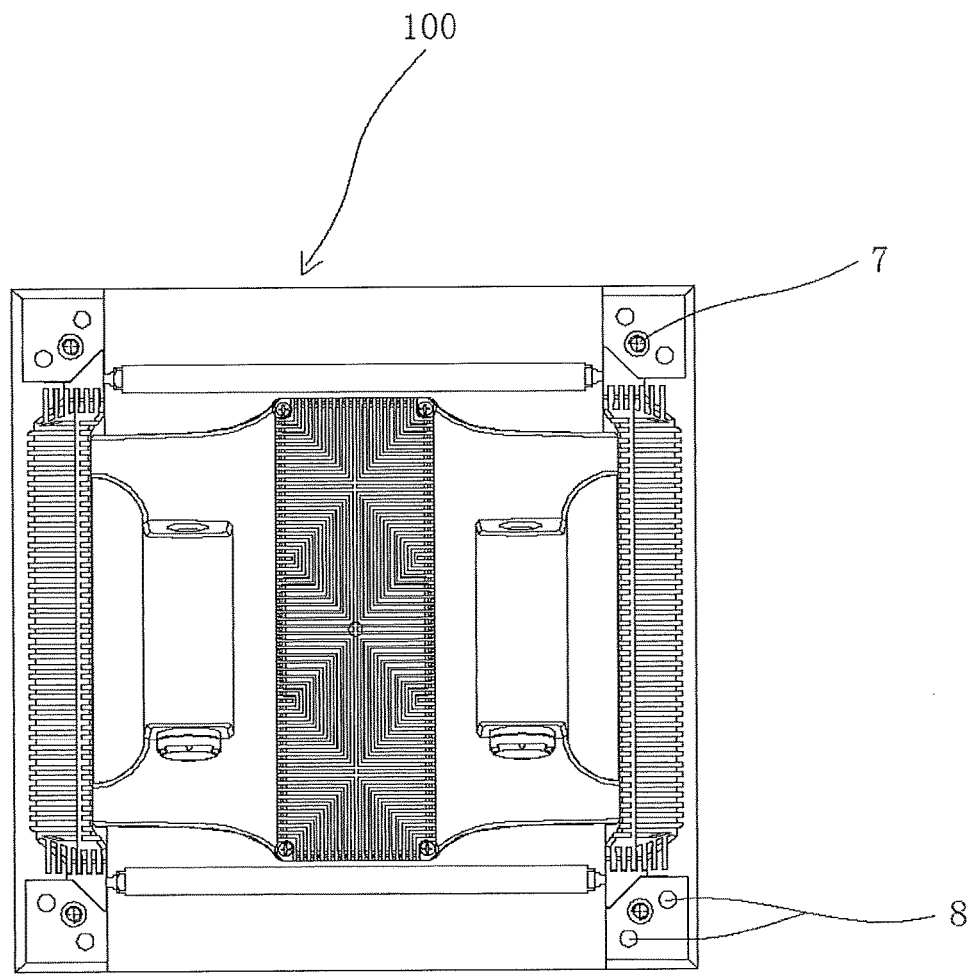
FIG. 6 is a top view of the LED module.
Figure 7:
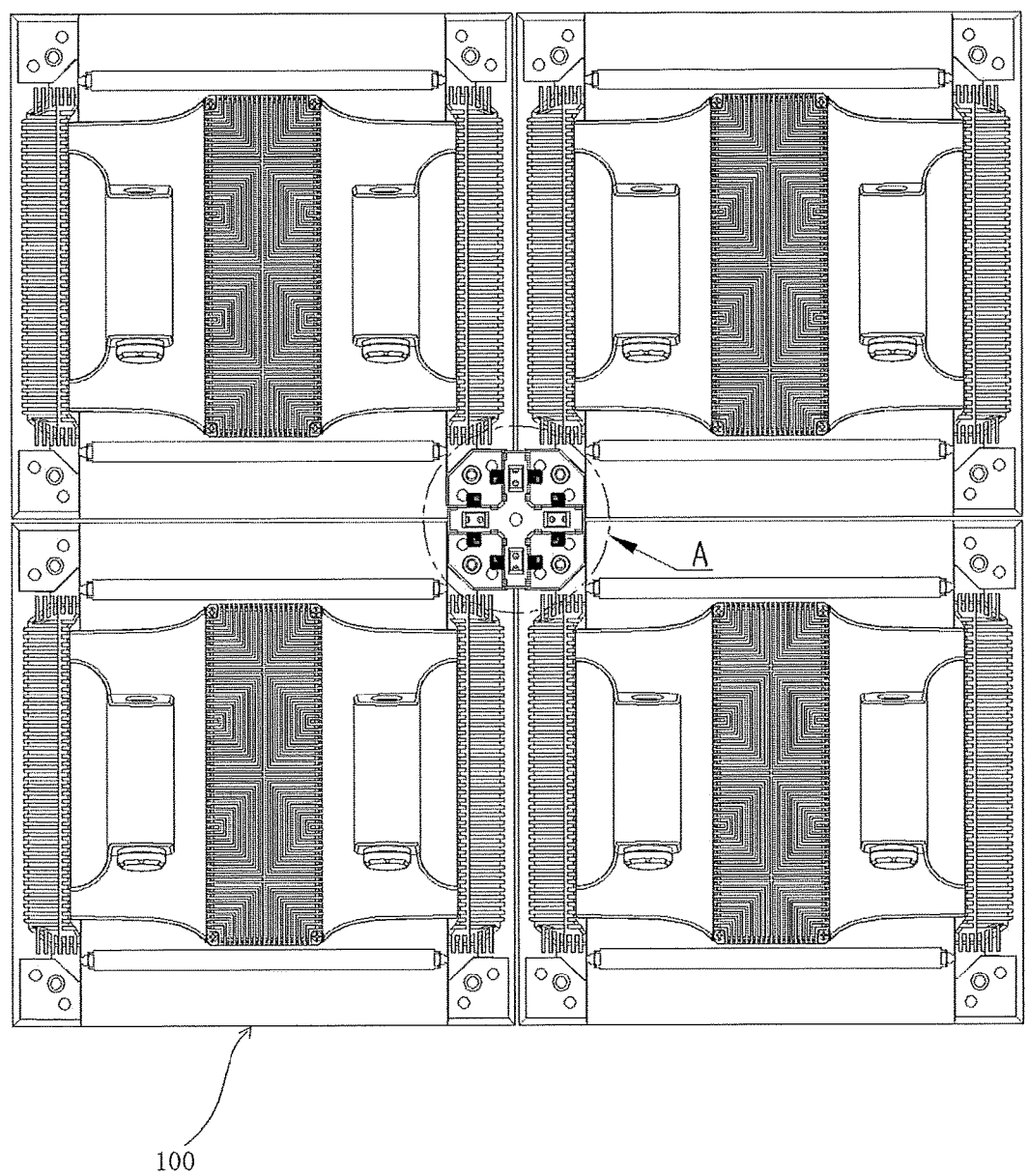
FIG. 7 is a top view of four LED modules of the first embodiment mounted on the four movable blocks of the LED module mounting mechanism of the present application.

The number of the moving blocks 3 is four, the four moving blocks 3 are respectively disposed on two sides of the horizontal frame 21 and two sides of the vertical frame 22, and show a grid ("田") pattern, the moving blocks 3 disposed on two ends of the horizontal frame 21 are movable along the X-axis direction and the moving blocks 3 disposed on two ends of the vertical frame 22 are movable along the Y-axis direction, one LED module 100 is mounted on one movable block 3 (referring to FIGS. 6 and 7).

The number of the gap adjusting means is four, the four gap adjusting means are respectively mounted on the horizontal frame 21 and the vertical frame 22, two ends of each gap adjusting mechanism are connected to two moving blocks 3 respectively, the gap between two LED modules 100 arranged on two moving blocks 3 is adjusted by moving the two moving blocks 3 on the two ends toward or away from each other, wherein the gap adjusting mechanism mounted on the horizontal frame 21 is a Y-axis adjustment mechanism, the gap adjusting mechanism mounted on the vertical frame 22 is an X-axis gap adjusting mechanism, wherein the Y-axis gap adjusting mechanism is mounted on the horizontal frame 21 in a manner capable of integrally moving along the Y-axis direction, and the X-axis gap adjusting mechanism is mounted on the vertical frame 22 in a manner capable of integrally moving along the X-axis direction.

The above solution is the core solution of the present application, by disposing the LED module mounting mechanism of the present application among four LED modules showing the grid ("田") pattern, each of the four movable blocks 3 of the LED module mounting mechanism is connected one corner of one of the four LED modules 100. The gaps along the X-axis direction between LED modules 100 arranged on moving blocks 3 are adjusted by adjusting the X-axis gap adjusting mechanism to move the moving blocks 3 disposed on the two ends of the X-axis gap adjusting mechanism toward or away from each other. The gaps along Y-axis direction between LED modules 100 arranged on moving blocks 3 are adjusted by adjusting the Y-axis gap adjusting mechanism to move the moving blocks 3 disposed on the two ends of the Y-axis gap adjusting mechanism toward or away from each other. Because the Y-axis gap adjusting mechanism mounted on the horizontal frame 21 is capable of integrally moving along the X-axis direction, when the gaps related to two movable blocks along X-axis direction is adjusted, the Y-axis gap adjusting mechanism can follow the movable blocks 3 to move with respect to the horizontal frame 21 along the X-axis direction, which will not affect adjustment of the gaps related to two movable blocks along the X-axis direction and adjusted by the X-axis gap adjusting mechanism. In a similar way, because the X-axis gap adjusting mechanism mounted on the vertical frame 21 is capable of integrally moving along the Y-axis direction, will not affect adjustment of the gaps related to two movable blocks along Y-axis direction adjusted by Y-axis gap adjusting mechanism.

There are many structures for implementing that the Y-axis gap adjusting mechanism is mounted on the horizontal frame 21 in a manner of integrally moving along the X-axis direction, and the X-axis gap adjusting mechanism is mounted on the vertical frame 22 in a manner of integrally moving along the X-axis direction. In this embodiment, preferably, the horizontal frame 21 is provided with an X-direction strip through hole 211 extending in the longitudinal direction along the X-axis direction, the vertical frame 22 is provided with a Y-direction strip through hole 221 extending in the longitudinal direction along the Y-axis direction, the X-axis gap adjusting mechanism is movably disposed within the Y-direction stripe through hole 221 and two ends of the X-axis gap adjusting mechanism extend out of the Y-direction stripe through hole 221 and are respectively connected to the left and right movable blocks 3, such that the two movable blocks 3 are capable of being driven to move toward or away from each other along the X-axis direction; and the Y-axis gap adjusting mechanism is movably disposed within the X-direction stripe through hole 211 and two ends of the Y-axis gap adjusting mechanism extend out of the X-direction stripe through hole 211 and are respectively connected to the upper and lower movable blocks 3, such that the two movable blocks 3 are capable of being driven to move toward or away from each other along the Y-axis direction.

Figure 1:
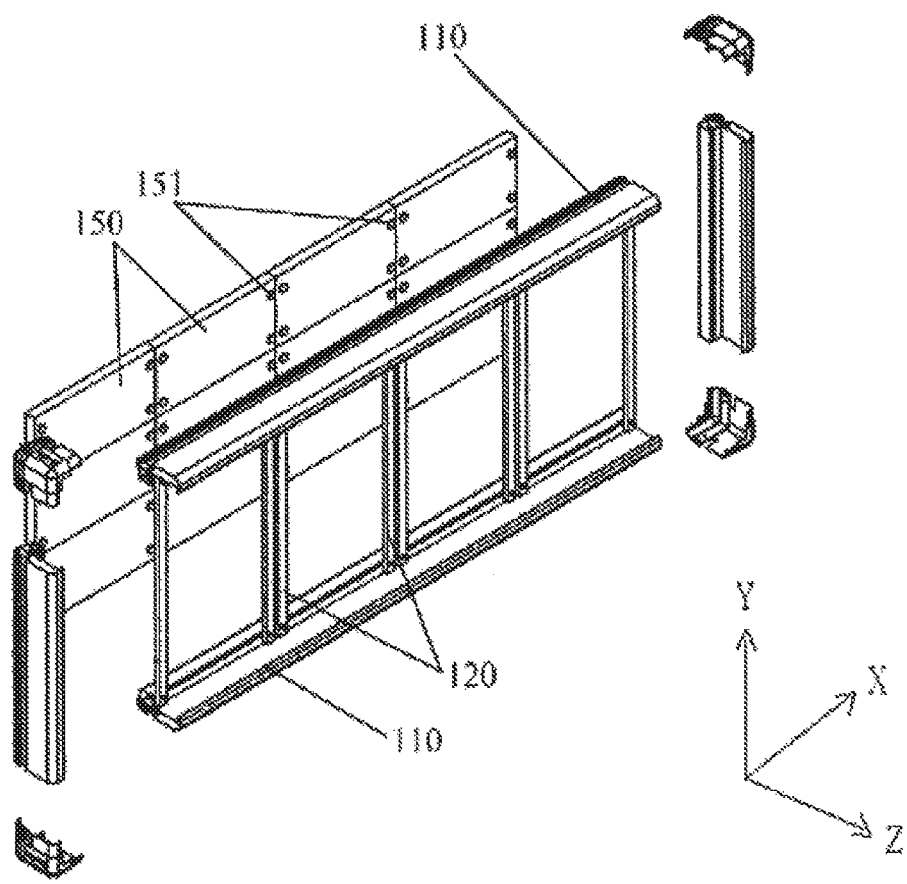
FIG. 1 is a perspective view of an existing adjustable LED display structure.
Figure 2:
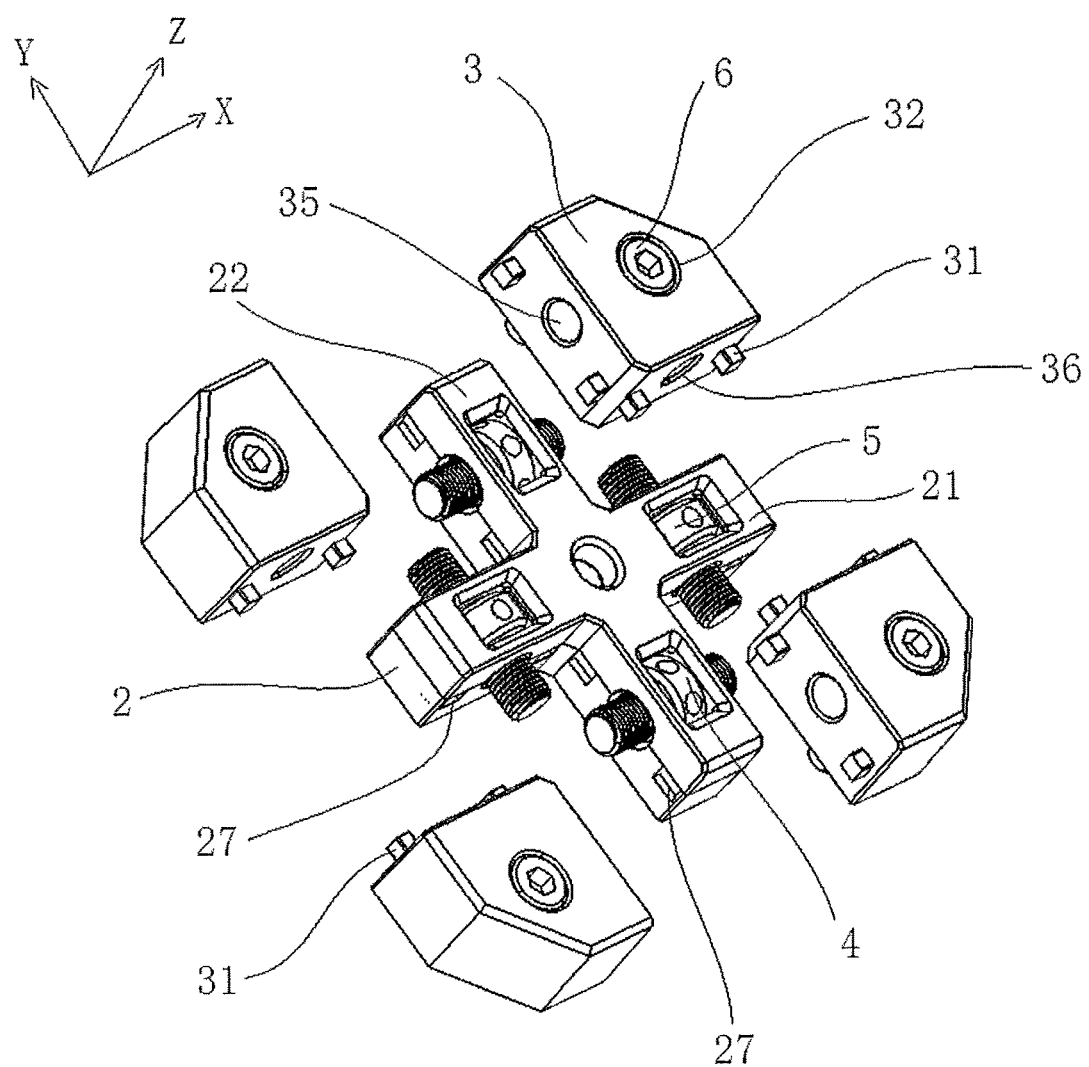
FIG. 2 is an exploded view of an LED module mounting mechanism according to a first embodiment of the present application.
Figure 3:
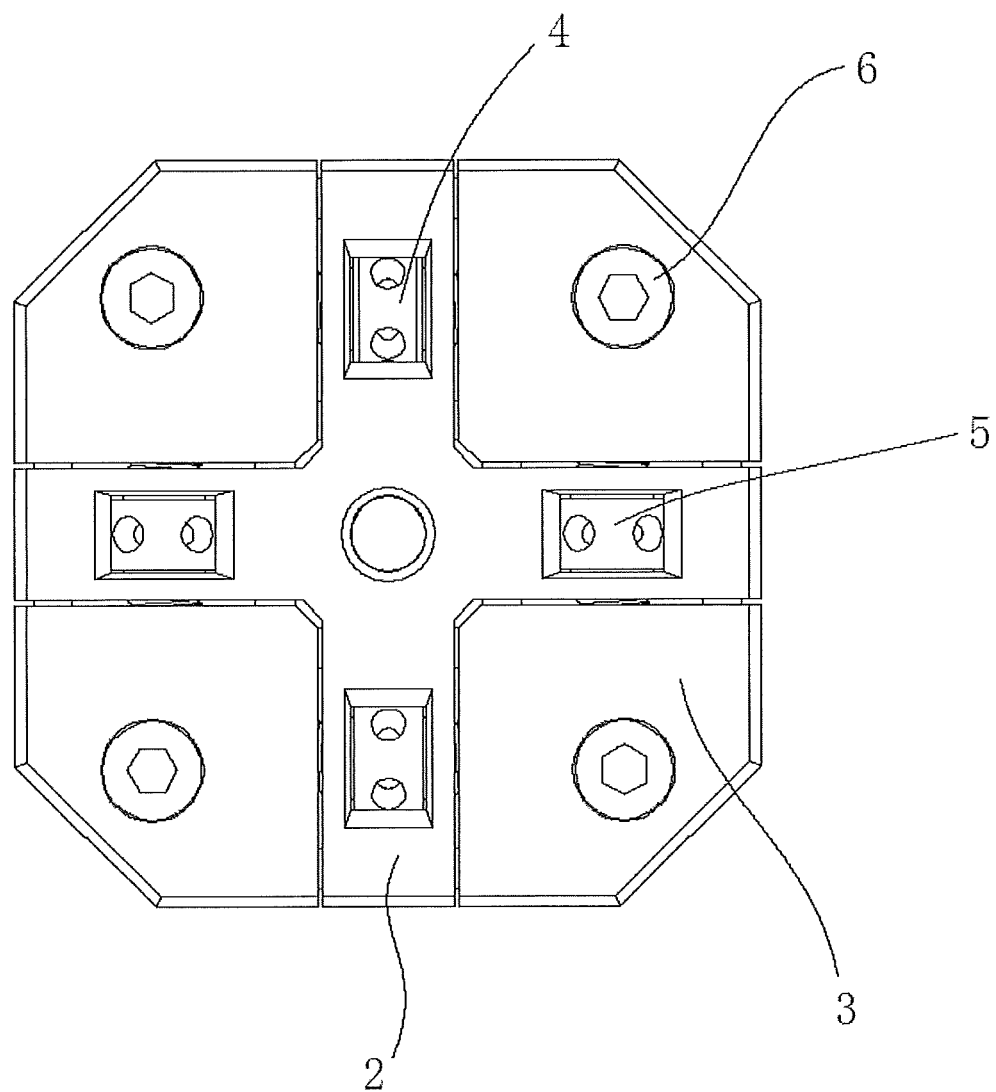
FIG. 3 is a front view of an LED module mounting mechanism of the embodiment of the present application.
Figure 4:
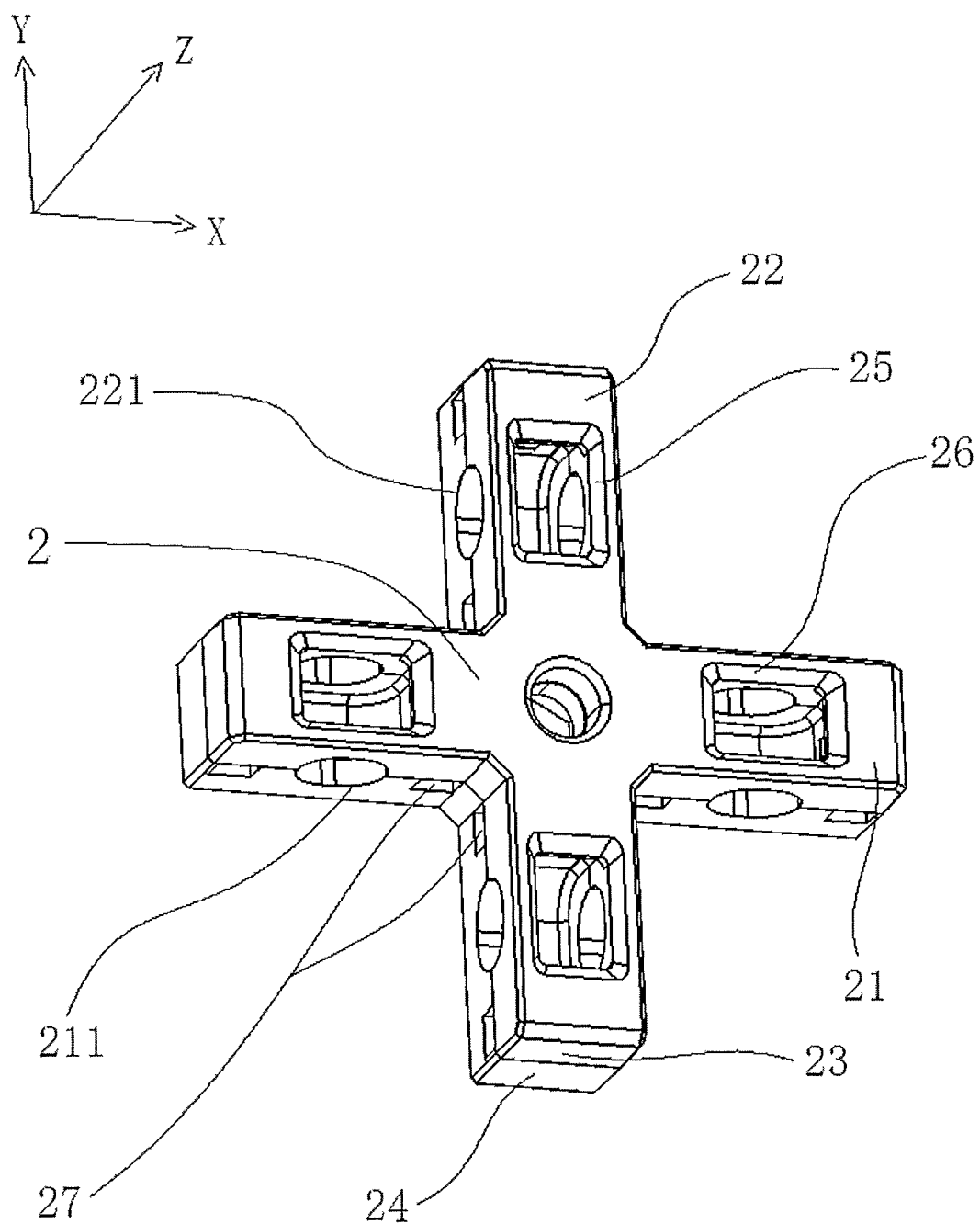
FIG. 4 is a perspective view of the fixing frame of the first embodiment.
Figure 5:
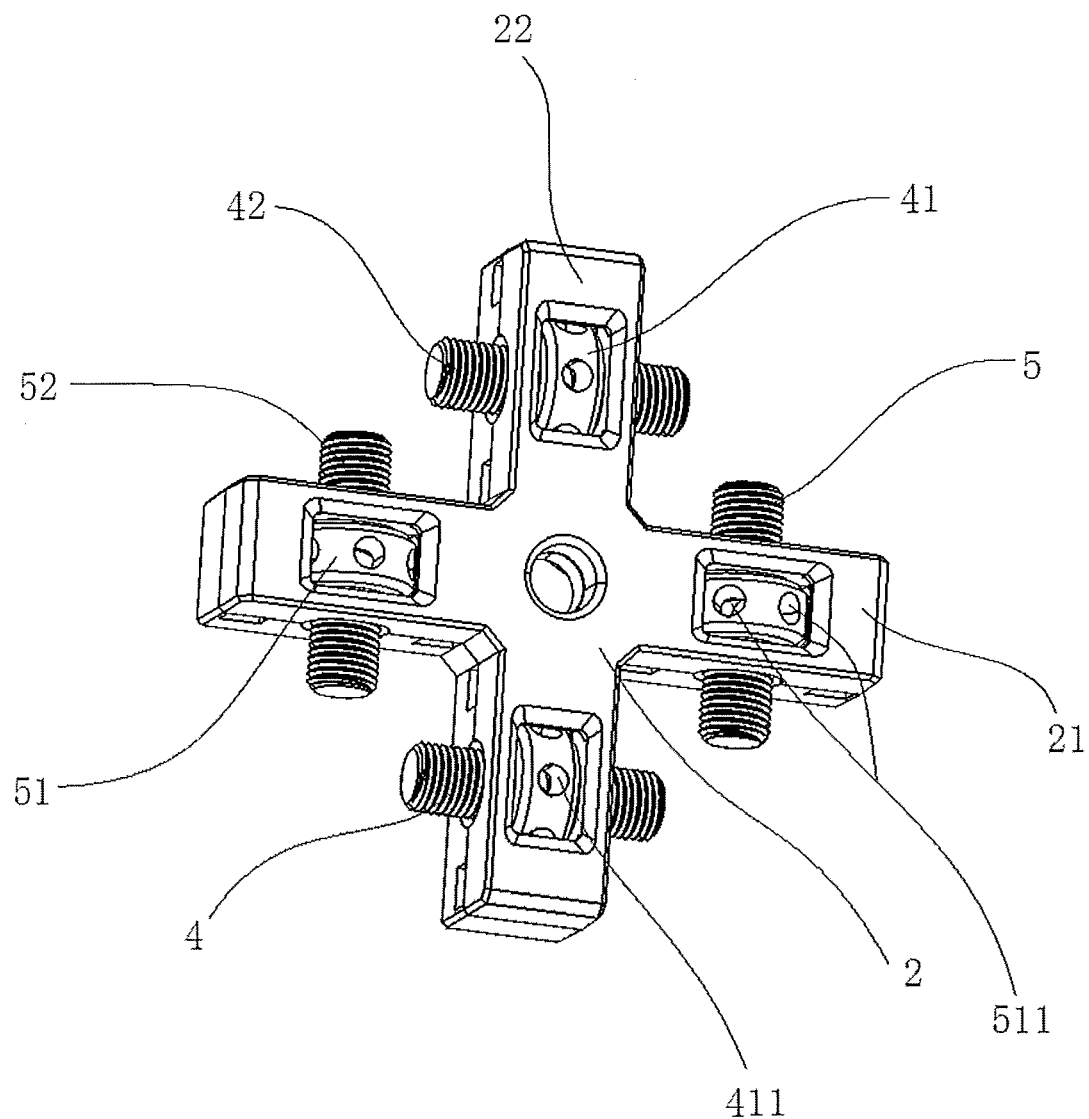
FIG. 5 is a perspective view of the X-axis adjusting screw and the Y-axis adjusting screw mounted on the fixing frame, according to the first embodiment.
Figure 8:
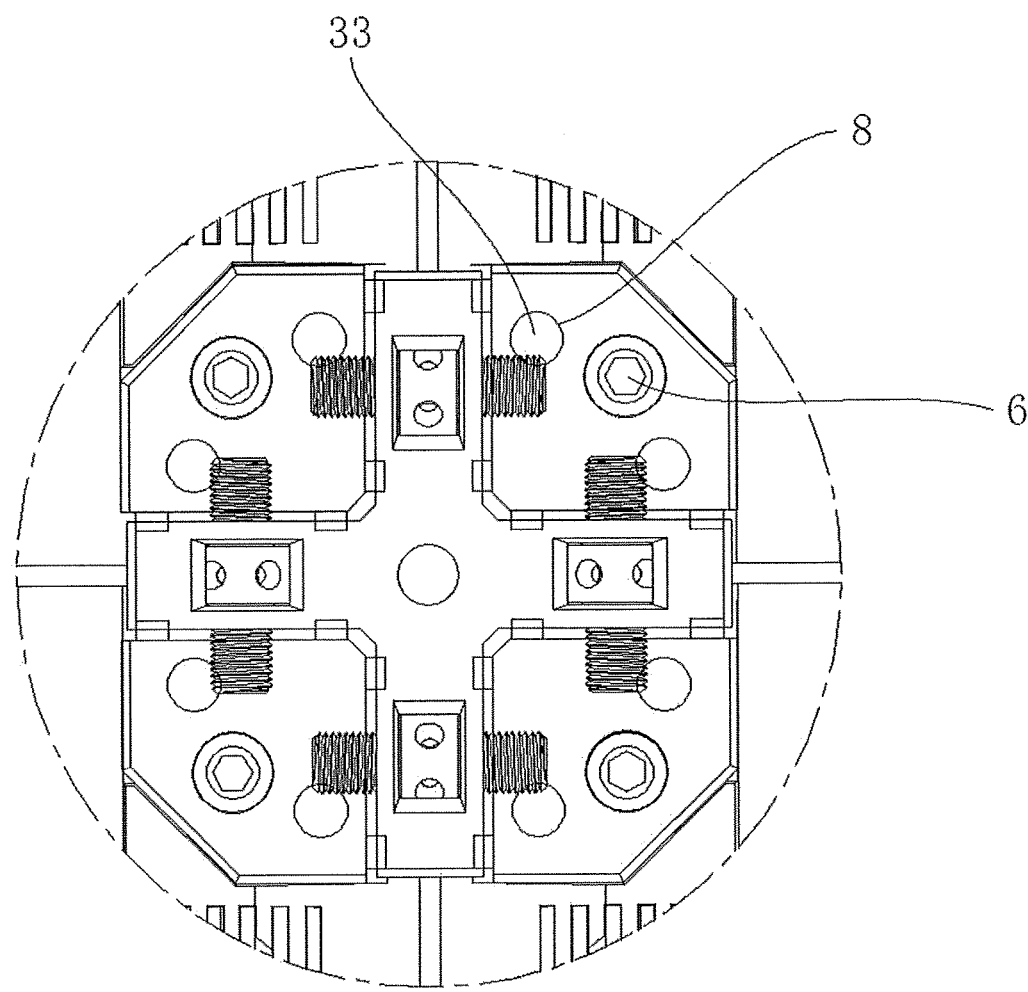
FIG. 8 is an enlarged view of the region A in FIG. 7.

Referring to FIG. 2, FIG. 4 and FIG. 5, the gap adjusting mechanism is an adjusting screw of which two ends are provided with screw threads, the X-axis gap adjusting mechanism is an X-axis adjusting screw 4, the Y-axis gap adjusting mechanism is a Y-axis adjusting screw 5, a side surface of the movable block 3 facing to the X-axis adjusting screw 4 is provided with a X-axis screw hole 35 adapted to be connected to the X-axis adjusting screw 4 in a threaded connection manner, and the side surface of the movable block 3 facing to the Y-axis adjusting screw 5 is provided with a Y-axis screw hole 36 adapted to be connected to the Y-axis adjusting screw 5 in a threaded connection manner. Also referring to FIG. 7 and FIG. 8, The structure of the adjusting screw and the screw hole facilitate connection and disconnection between the gap adjusting mechanism and the movable block 3, and threaded adjustment can control a relative movement between the gap adjusting mechanism and the movable block 3 more accurately and more stably, such that adjustment of the gaps between the LED modules mounted on the movable block is more accurate and more stable, the adjusting method is simple, and the operation is easy.

The X-axis adjusting screw 4 comprises a X-axis adjusting portion 41 and two X-axis threaded portions 42 fixedly connected to two sides of the X-axis adjusting portion 41, the thread directions of the two X-axis threaded portions 42 are opposite, the two X-axis threaded portions 42 are respectively connected to the X-axis screw holes 35 on two sides of the X-axis adjusting screw 4, the thread direction of the X-axis screw holes 35 are matched with the corresponding X-axis threaded portion 42; the Y-axis adjusting screw 5 comprises a Y-axis adjusting portion 51 and two Y-axis threaded portions 52 fixedly connected to two sides of the Y-axis adjusting portion 51, the thread directions of the two Y-axis threaded portions 52 are opposite, the two Y-axis threaded portions 52 are respectively connected to the Y-axis screw holes 36 on two sides of the Y-axis adjusting screw 5, the thread direction of the Y-axis screw holes 36 are matched with the corresponding Y-axis threaded portion 52, to make the two movable blocks 3 connected with the two opposite threads move oppositely, such that the movable blocks 3 disposed on two sides of the horizontal frame 21 can be move forward or away from each other.

To facilitate mounting the X-axis adjusting screw 4 and the Y-axis adjusting screw 5 on the fixing frame 2 simply and quickly, in this embodiment, the structure of the fixing frame 2 is detachable. Preferably, the fixing frame 2 is formed by fastening a cross-shaped first fixing frame 23 and a cross-shaped second fixing frame 24, the X-axis adjusting screw 4 and the Y-axis adjusting screw 5 are disposed between the first fixing frame 23 and the second fixing frame 24.

A part of the first fixing frame 23 or the second fixing frame 24 corresponding to the X-axis adjusting screw 4 is provided an opening 25 extending in the longitudinal direction along the Y-axis direction, and a part of the first fixing frame 23 or the second fixing frame 24 corresponding to the Y-axis adjusting screw 5 is provided with an opening 26 extending in the longitudinal direction along the X-axis direction; At least a part of the X-axis adjusting portion 41 and at least a part of the Y-axis adjusting portion 51 are respectively arranged in the corresponding opening 25, 26, two longer opposite side walls of the opening 25 and/or two longer opposite side walls of the opening 26 respectively limit the part of the X-axis adjusting portion 41 arranged therein and/or the part of the Y-axis adjusting portion 51 arranged therein to limit the X-axis adjusting portion 41 or the Y-axis adjusting portion 51, thereby further avoiding the X-axis adjusting screw from moving along the X-axis direction and affecting the adjustment of the gap between the LED modules 100 along the X-axis direction, and/or avoiding the Y-axis adjusting screw from moving along the Y-axis direction and affecting the adjustment of the gap between the LED modules 100 along the Y-axis direction.

An outer circumference wall of the X-axis adjusting portion 41 is provided a plurality of X-axis adjusting holes 411 which are configured to be inserted by a tool to rotate the X-axis adjusting screw 4; the outer circumference wall of the Y-axis adjusting portion 51 is provided a plurality of Y-axis adjusting holes 511 which are configured to be inserted by a tool to rotate the Y-axis adjusting screw 5. When the X-axis adjusting screw 4 is adjusted, it only needs a tool with a slender rod-shaped structure to be inserted into the X-axis adjusting hole 411, the tool is used to poke the X-axis adjusting hole 411 along the Y-axis direction to achieve the adjustment for the X-axis adjusting screw 4; when the Y-axis adjusting screw 5 is adjusted, it only needs the tool with a slender rod-shaped structure to be inserted into the Y-axis adjusting hole 511, the tool is used to poke the Y-axis adjusting hole 511 along the X-axis direction to achieve the adjustment for the Y-axis adjusting screw 5. The arrangement of the X-axis adjusting hole 411 and the Y-axis adjusting hole 511 makes adjusting the X-axis adjusting screw 4 and the Y-axis adjusting screw 5 save energy and be convenient.

The shapes of cross section of the X-direction strip through hole 211 and the Y-direction stripe through hole 221 are not restricted, as long as the shape is a bar shape, for example a rectangular shape. In this embodiment, the cross sections of the X-direction strip through hole 211 and the Y-direction stripe through hole 221 are preferably ellipse shapes.

Referring to FIG. 2, furthermore, in this embodiment, a surface of each of the movable blocks 3 facing to the fixing frame 2 is formed with at least one projection 31, the corresponding part of the fixing frame 2 is provided with a recess 27, the projection 31 is movably engaged in the recess 27. The structures of the projection 31 and the recess 27 allow the movable block 3 to be mounted on the fixing frame 2 directly and share the weight of the movable blocks 3 born by the X-axis adjusting screw 4 and the Y-axis adjusting screw 5, and can also restrict the movement of the movable block 3 along the direction perpendicular to X-Y plane.

Referring to FIG. 2 and FIG. 9 to FIG. 11, the direction perpendicular to the plane of the LED modules 100 mounted on the movable blocks 3 is defined as a Z-axis direction, the LED module mounting machine, the LED module mounting mechanism further comprises a Z-axis adjusting mechanism mounted in the movable block 3, corners of the LED module 100 are correspondingly provided with a Z-axis cooperating mechanism, the Z-axis adjusting mechanism cooperate with the Z-axis cooperating mechanism of the LED module 100 to adjust the LED module 100 to move toward or away from the movable block 3 along the Z-axis direction.

The LED module mounting mechanism may adjust the gap and the planeness in the Z-axis direction perpendicular to the plane of the LED modules. It can ensure that the surface of the LED module is flushed, so the LED module looks no dislocation when seen from the side, which can improve viewing effect of the audience on the side, and overcome height difference between the screens which can be seen from the side and is resulted from the unreasonable Z-axis flatness, therefore the audience on the side do not see black lines between screens or non-continuous images.

Referring to FIG. 2 and FIG. 9 to FIG. 11, a mounting hole 32 extending along the Z-axis direction is formed on the movable block 3, the Z-axis adjusting mechanism is a Z-axis adjusting screw 6 axially limited in the mounting hole 32, the Z-axis cooperating mechanism is a Z-axis adjusting bolt 7 formed on back corner of the LED module 100, the Z-axis adjusting screw 6 is connected to the Z-axis adjusting bolt 7 formed on corner of the LED module 100. The thread structure between the Z-axis adjusting screw 6 and the Z-axis adjusting bolt 7 can make the Z-axis adjusting screw 6 adjust the planeness of the LED modules along Z-axis direction more precisely and more stably and make the operation simple.

Figure 13:
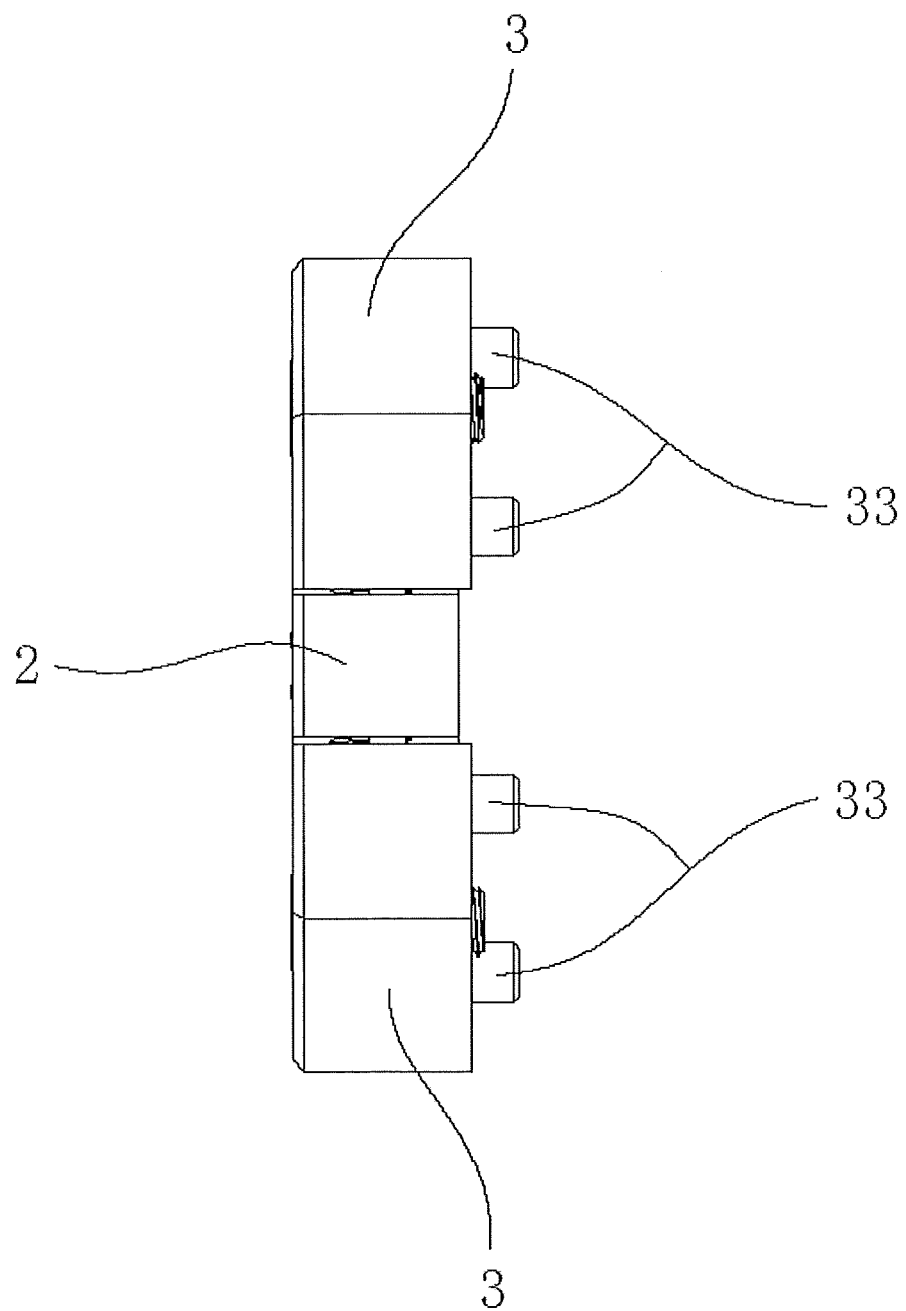
FIG. 13 is a right view of the LED module mounting mechanism according to the first embodiment of the present application.
Figure 14:
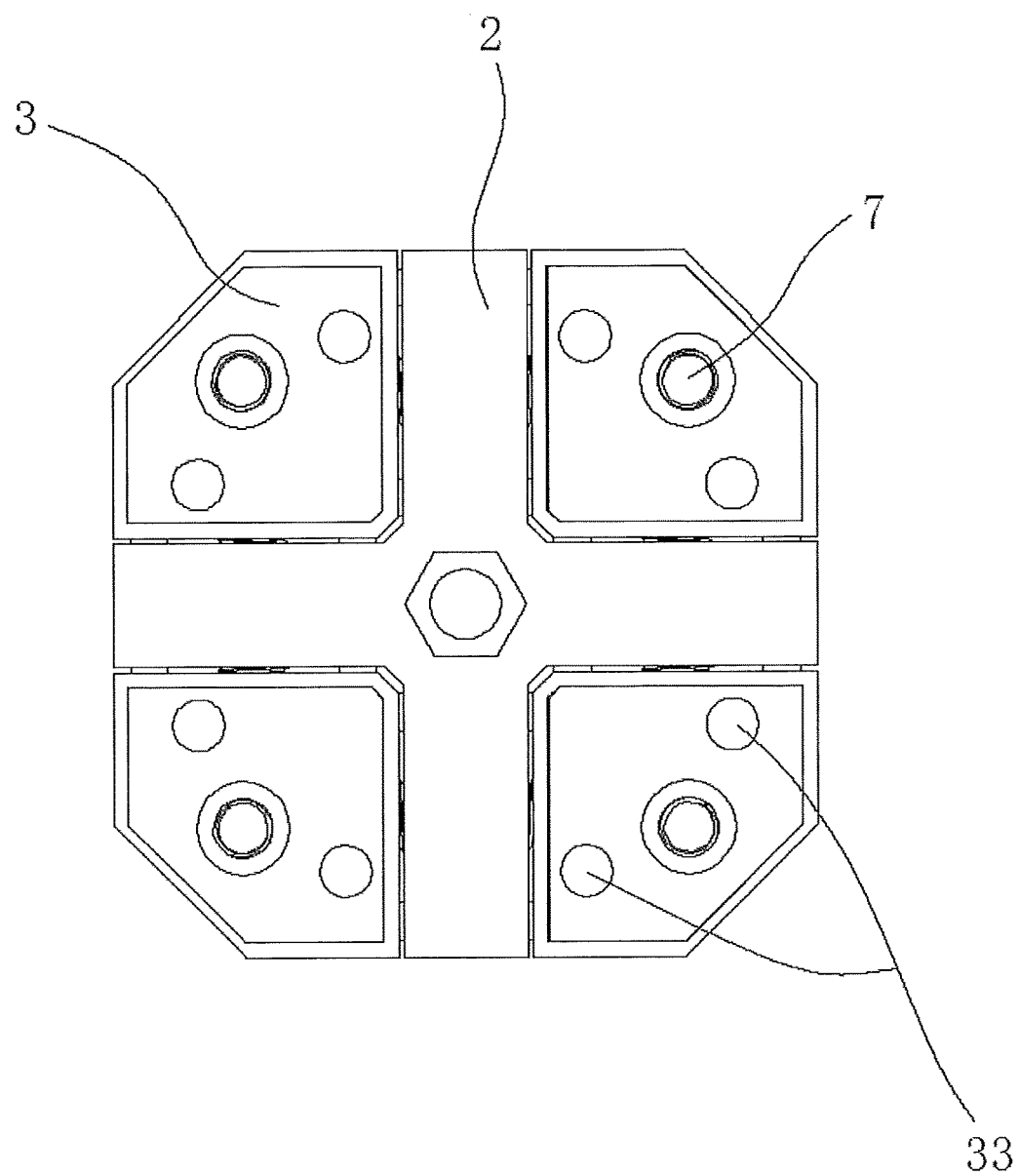
FIG. 14 is a rear view of the LED module mounting mechanism according to the first embodiment of the present application.

Referring to FIG. 6, FIG. 13 and FIG. 14, each of the movable block 3 is provided with at least one positioning column 33 extending in a longitudinal direction along the Z-axis direction, each corner of the LED module 100 configured to be connected to the corresponding movable block 3 is provided with at least one positioning hole 8 adapted to be inserted by the positioning column 33, the positioning column 33 is capable of being inserted into the positioning holes 8. The positioning column 33 and the Z-axis adjusting screw 6 are configured to position the LED module 100 during assembly. In this embodiment, each movable block 3 is provided with two positioning columns 33, each of four corners of the LED module 100 is correspondingly provided with two positioning holes 8.

It should be noted that the manner in which the LED module 100 is mounted on the movable block 3 of the LED module mounting mechanism is not limited to the manner of thread connection between the Z-axis adjusting screw and the Z-axis adjusting bolt. The four corners of the back of the LED module may be provided with a hook or a clamping groove, and the movable block 3 of the LED module mounting mechanism is correspondingly provided with the clamping groove or the hook, the LED module may be mounted on the LED module mounting mechanism in the clamping manner, and the LED module may be mounted on the movable block 3 through a pin bolt. The LED module may be mounted on the movable block 3 in any manner, which is not the focus of the present application, therefore there is no longer expatiatory. Of course, in this embodiment, the LED module is preferably mounted on the movable block 3 of the LED module mounting mechanism of the present application in the manner of thread connection between the Z-axis adjusting screw 6 and the Z-axis adjusting bolt 7. Such mounting way not only saves the components, but also is easy to operate.

Figure 10:
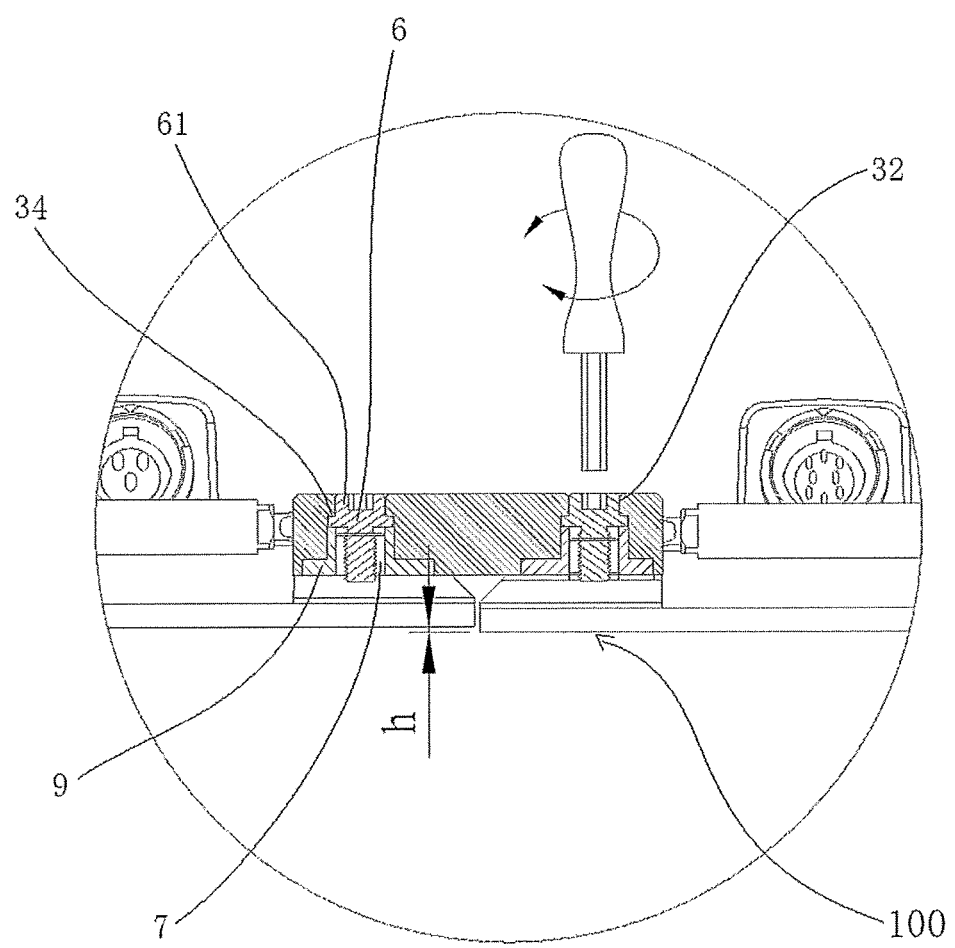
FIG. 10 is an enlarged view of the region B in FIG. 9.

Referring to FIG. 10, furthermore, in this embodiment, a step 34 is formed on an inner wall of the mounting hole 32, an annular projection 61 is formed on a head of the Z-axis adjusting screw 6 adapted to be screwed by tools, a side of the annular projection 61 abuts against the step 34, the other side of the annular projection 61 is provided with a limiting block 9, the Z-axis adjusting screw 6 and the limiting block 9 are axially limited in the mounting hole 32 through the step 34. Therefore the Z-axis adjusting screw 6 can only rotate about the Z-axis and any translational motion cannot happen. When the Z-axis adjusting screw 6 is adjusted, it only controls the translation of the LED module 100 along Z-axis direction, and doesn't affect the positioning of the LED module 100 in the X-axis and Y-axis, thereby ensuring that the LED module is mounted on the LED module 100 mounting mechanism more accurately and more stably.

The assembly of the LED module mounting mechanism and the assembly of the LED module and adjustment of the gap between the LED modules by the LED module mounting mechanism are as follows:

When the LED module mounting mechanism is assembled, referring to FIG. 2-FIG. 5, firstly the X-axis adjusting screw 4 and the Y-axis adjusting screw 5 are connected to the four movable blocks 3 in the thread connection manner, and the connected parts are all disposed on the second fixing frame 24 or the first fixing frame 23, the second fixing frame 24 or the first fixing frame 23 then cover that parts, the Z-axis adjusting screw 6 is accommodated in the mounting hole 32, the limiting block 9 is disposed in the mounting hole 32 through the tail of the Z-axis adjusting screw 6 and abuts against the annular projection 61 of the Z-axis adjusting screw 6 (referring to FIG. 10), and the limiting block 9 is positioned on the movable block 3, then the assembly of the whole LED module mounting mechanism is finished.

Figure 12:
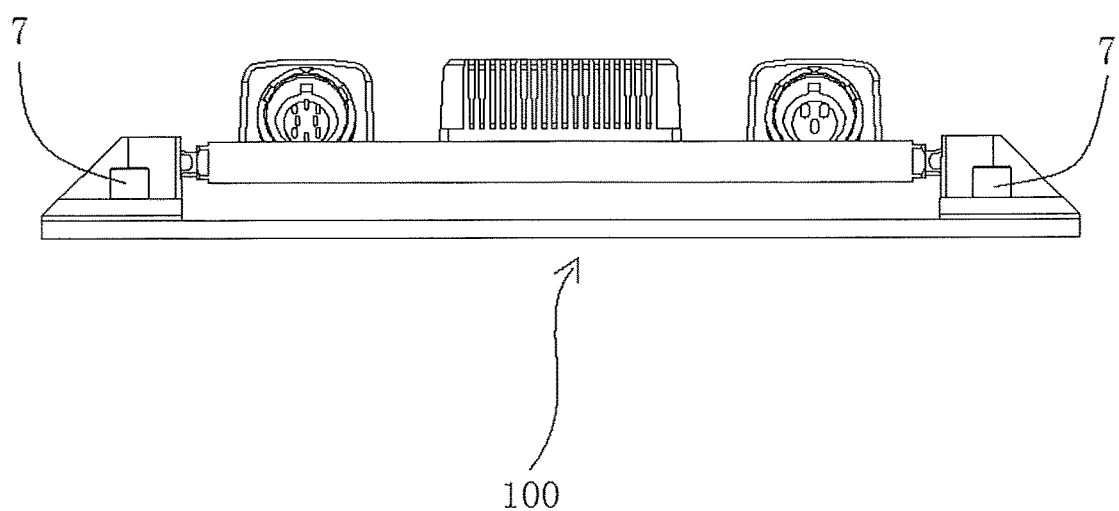
FIG. 12 is a side view of the LED module.

When the LED modules 100 are assembled, firstly the LED module mounting mechanism of the present application is assembled, and referring to FIG. 12-FIG. 14, the Z-axis adjusting bolt 7 and two positioning holes 8 of the LED module are aligned with the Z-axis adjusting screw 6 and the two positioning columns 33 of the movable block 3 respectively, then the two positioning holes 8 of the LED module are moved to sleeve the two positioning columns 33 of the movable block 3 (referring to FIG. 8), and meanwhile the Z-axis adjusting bolt 7 of the LED module is connected to the Z-axis adjusting screw 6 of the movable block 3 in the thread connection manner, then the positioning and mounting the LED module on the LED module mounting mechanism are finished.

Figure 15:
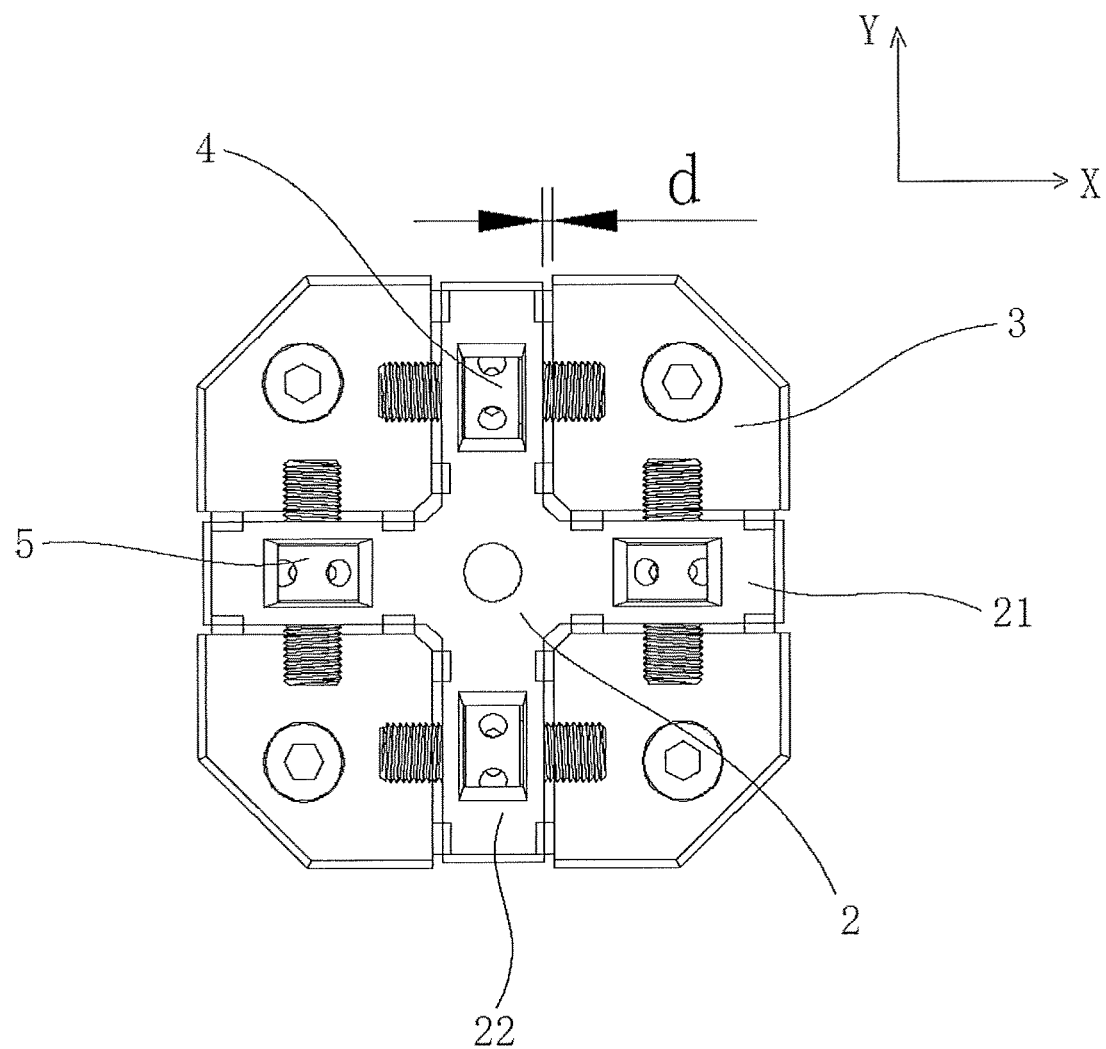
FIG. 15 is a top view of the LED module mounting mechanism of the first embodiment of the present application in a first state, which illustrates that the gap between the movable block and the fixing frame along the X-axis direction is d.
Figure 16:
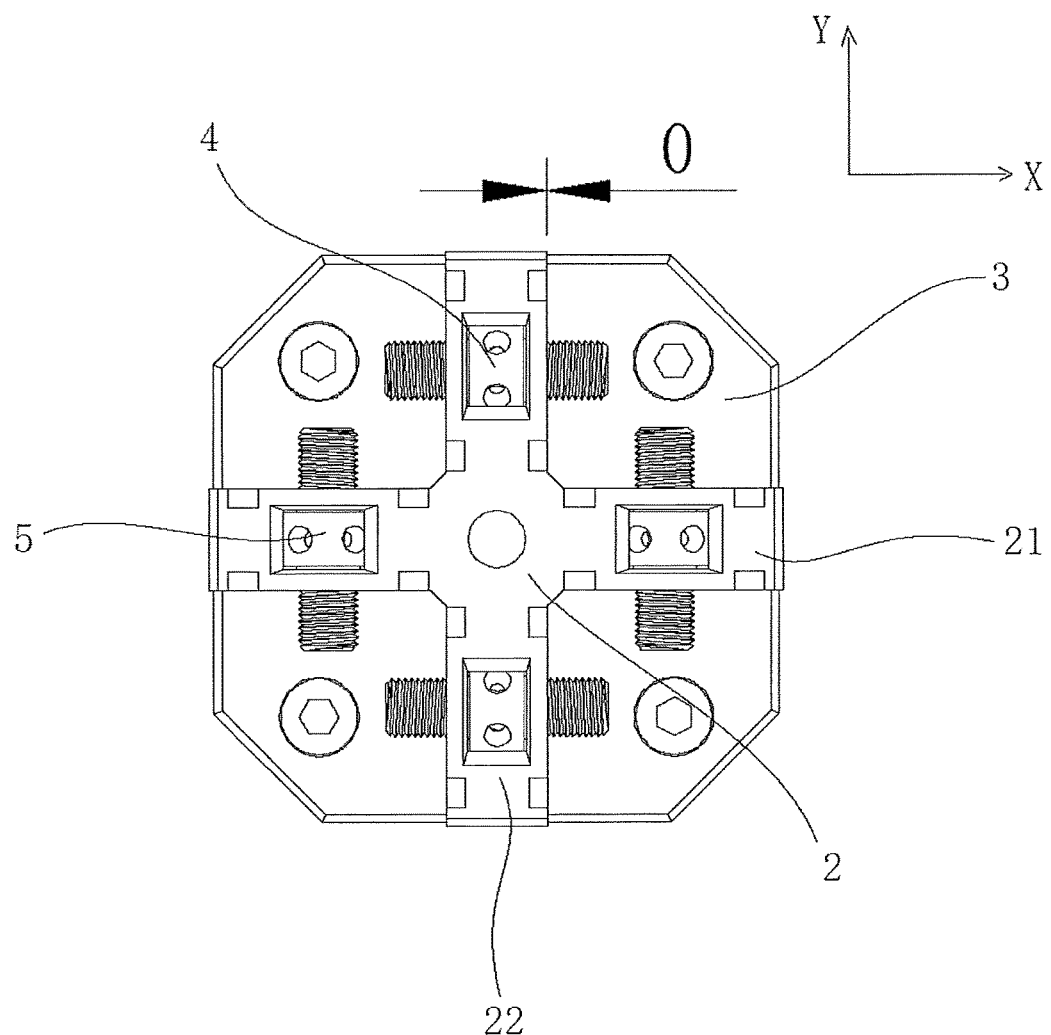
FIG. 16 is a top view of the LED module mounting mechanism of the first embodiment of the present application in a second state, which illustrates that the gap between the movable block and the fixing frame along the X-axis direction is 0.

After the LED modules 100 are mounted the LED module mounting mechanism, when the gap between the LED modules 100 needs to be adjusted to be smaller along the X-axis direction, as shown in FIG. 15, the X-axis adjusting hole 411 is poked to make the movable blocks 3 on the two sides of the vertical frame 22 move toward each other, such that the gap between the LED modules 100 mounted on the movable blocks 3 becomes small along the X-axis direction (referring to FIG. 7 and FIG. 8); when the gap between the LED modules 100 needs to be adjusted to be bigger along the X-axis direction, the X-axis adjusting hole 411 is poked inversely to make the gap between the movable blocks 3 and the fixing frame 2 bigger gradually, such that the gap between the LED modules 100 mounted on the movable blocks 3 becomes bigger along the X-axis direction accordingly. The adjustment for the gap between the LED modules 100 along Y-axis direction is the same as the adjustment for the gap between the LED modules 100 along X-axis direction, except that the Y-axis adjusting hole 511 is poked rather than the X-axis adjusting hole 411. The adjusting range of the gap between the movable block 3 and the fixing frame 2 along the X-axis direction and Y-axis direction is very flexible, and may be from an initial gap d (referring to FIG. 15) to 0 (referring to FIG. 16).

Figure 9:
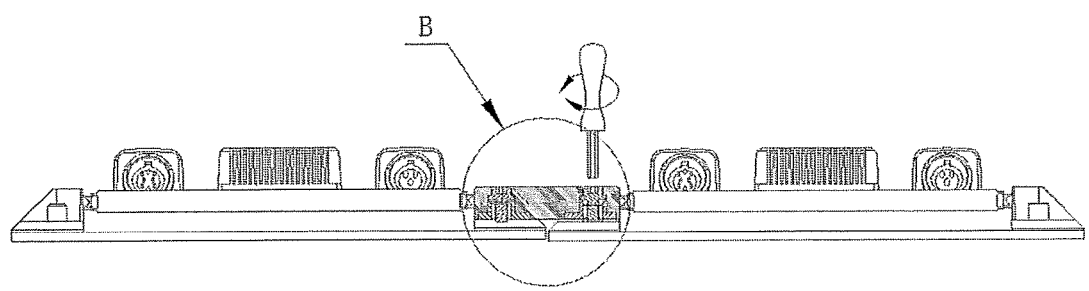
FIG. 9 is a side view of a first state in which the LED module of the first embodiment is mounted on the LED module mounting mechanism of the present application, which illustrates that the plane offset between two LED modules.
Figure 11:
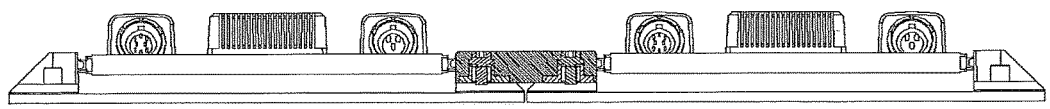
FIG. 11 is a side view of a second state in which the LED module of the first embodiment is mounted on the LED module mounting mechanism of the present application, which illustrates that two LED modules are flushed.

When the planeness between two LED modules 100 along the Z-axis direction needs to be adjusted, as shown in FIG. 9-FIG. 11, when there is a dislocation h between two LED modules 100 when viewed from the side, the tool matched with the groove on the head of the Z-axis adjusting screw 6 is inserted in to the head of the Z-axis adjusting screw 6 adjacent to the LED module 100 on the right of the FIG. 10 and is rotated, to make the Z-axis adjusting bolt 7 of the LED module 100 connected to the Z-axis adjusting screw 6 move upward under the drive of the thread, such that the LED module 100 is driven to move upward, until the two LED modules 100 are flushed, as shown in FIG. 11, then the adjustment is stopped, that is the adjustment for the planeness of the LED modules 100 along Z-axis direction is finished.

Four LED modules 100 are mounted on the LED module mounting mechanism, each LED module 100 is mounted on one LED module mounting mechanism through one of the four corners, the other three corners are respectively mounted on other LED module mounting mechanisms. When the gaps between four LED modules 100 mounted on one LED module mounting mechanism are adjusted along X-axis, Y-axis and Z-axis, the adjusted LED modules 100 are assembled to other LED modules 100 through the second LED module mounting mechanism, if necessary, the gaps between LED modules 100 mounted on the second LED module mounting mechanism are adjusted along the X-axis, the Y-axis, and the Z-axis. Follow the above steps, all the LED modules 100 are assembled together through the appropriate number of LED module mounting mechanisms with suitable gaps along X-axis, Y-axis and Z-axis, to form the LED screen which has dense dots and good viewing effect.

Second Embodiment

Figure 17:
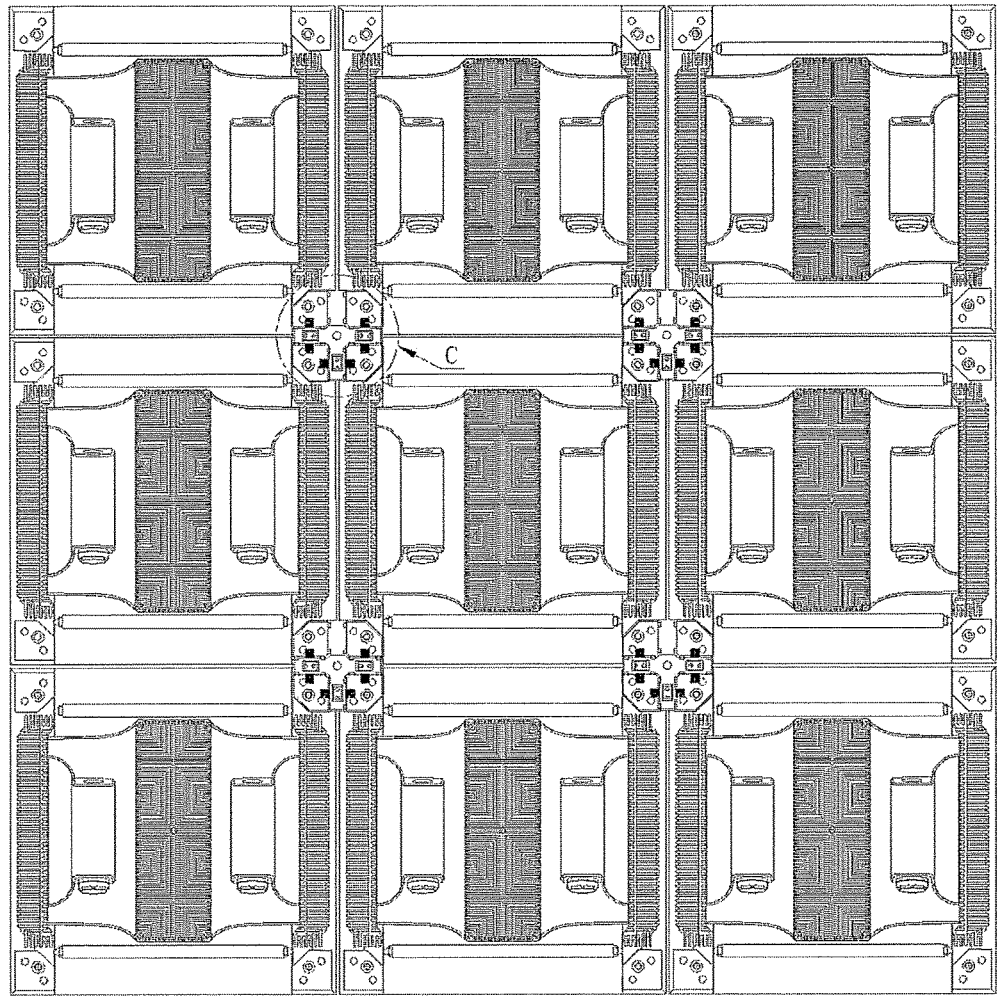
FIG. 17 is a top view of a plurality of LED modules assembled through the LED module mounting mechanism according to a second embodiment of the present application.
Figure 18:
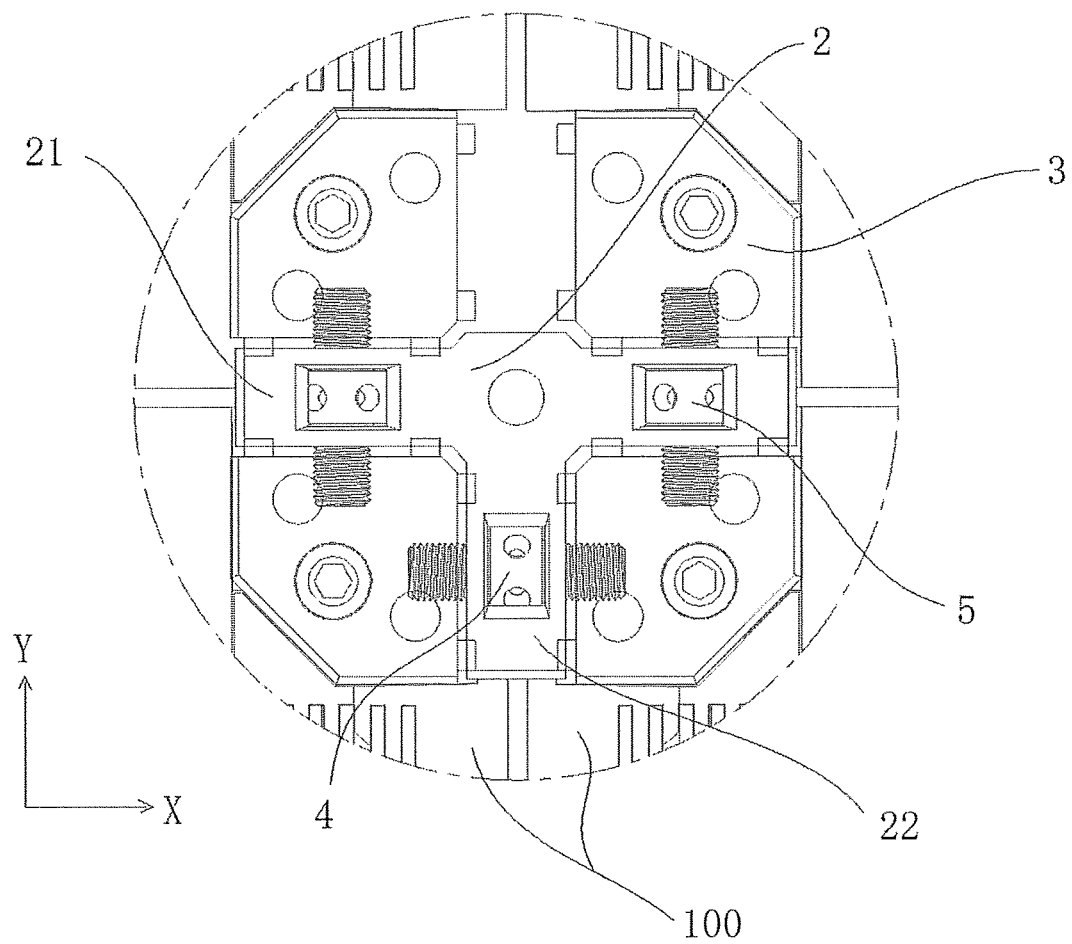
FIG. 18 is an enlarged view of the region C in FIG. 17.

The second embodiment of the present application is basically the same with the first embodiment, it differs from the first embodiment in that the fixing frame 2 shows a "T" pattern in the second embodiment. As shown in FIG. 17 and FIG. 18, the vertical frame 22 of the fixing frame 2 is connected to the horizontal frame 21, in this embodiment preferably connected to the middle position of the horizontal frame 21. Two sides of the horizontal frame 21 are respectively provided with two Y-axis adjusting screws 5 connecting the movable blocks 3 together along a Y-axis direction, the vertical frame 22 is provided with the X-axis adjusting screws 4 connecting the movable blocks 3 together along an X-axis direction, such that the four movable blocks 3 are mounted on the fixing frame 2 through the X-axis adjusting screws and the Y-axis adjusting screw. The LED modules mounted on the movable blocks 3 may also be assembled to form the LED display screen shown in FIG. 17 through the LED module mounting mechanisms of this embodiment. The adjustment for the gaps between the LED modules along the X-axis and Y-axis and the adjustment for the planeness along the Z-axis may also be achieved in this embodiment, the adjusting way is basically the same with the first embodiment, and it will not be mentioned in this text. Further more, in this embodiment, adjustment for the gaps and the planeness between the LED modules mounted on one LED module mounting mechanism are also implemented first, then the LED modules are assembled to the other LED modules to from the LED display screen through the other LED module mounting mechanisms.

Figure 19:
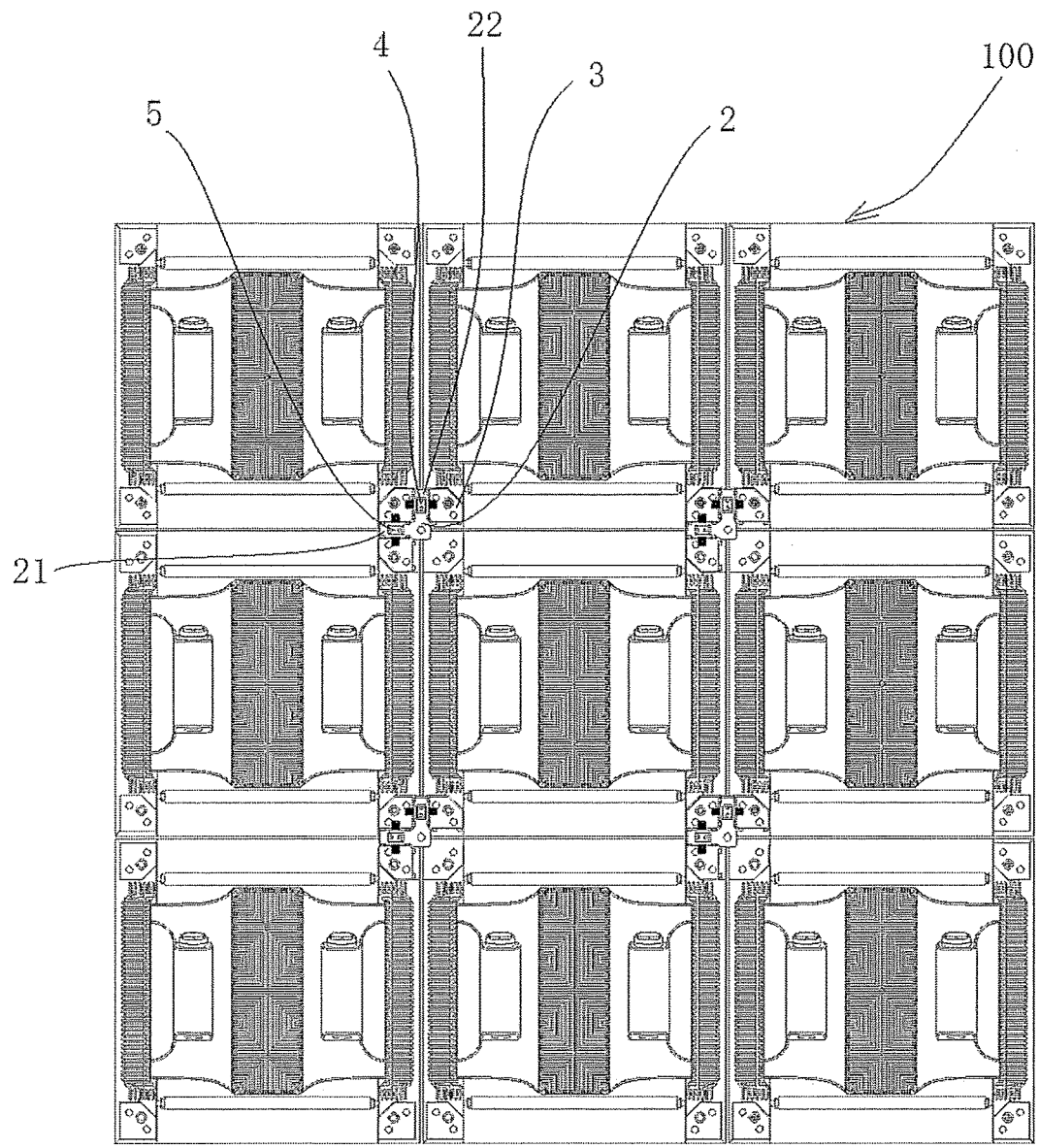
FIG. 19 is another implementation of the LED module mounting mechanism according the present application.

In the LED module mounting mechanism of the present application, the movable blocks 3 are not limited to the grid ("田") pattern, as long as the movable blocks 3 are respectively disposed on two sides of the horizontal frame 21 and the vertical frame 22 and can be moved toward or away from each other along the X-axis and the Y-axis, it fall within the protection scope of the present application. For example, as shown in FIG. 19, the fixing frame shows an "L" pattern, the number of the movable blocks 3 is three, the movable blocks 3 are respectively disposed on two sides of the horizontal frame 21 and the vertical frame 22, such arrangement of the movable blocks 3 can also achieve the adjustment for the gaps between the LED modules along the X-axis and Y-axis and the adjustment for the planeness along the Z-axis through the X-axis adjusting screw 4 and the Y-axis adjusting screw 5.

The structure of the LED module mounting mechanism of the present application is simple and compact, therefore the LED module mounting mechanism can be applied not only to larger dot pitch LED modules, but also to smaller dot pitch LED modules, and the application range thereof is very extensive. When the LED module performs a gap adjustment, seamless splicing can be achieved, therefore the screen shows neither black line nor bright line when seen in the front, and does not need to be adjusted by manually adding a material, the adjustment effect is good, the adjustment way is simple, and time for adjustment is saved. Moreover, compared with the existing method for adjusting the gaps between LED modules through magnetic attraction, the LED module mounting mechanism makes the gaps between the LED modules more stable after adjustment and difficult to change automatically or due to outside interference.

Clearly, the above-described embodiments are merely made to clearly illustrate the given examples, and do not intend to limit the implementations. Ordinary skilled person in the art may make other changes or variants in different form based on the above description. It doesn't need to and can not list all embodiments herein. Obvious changes or variants evolved therefrom are still in the protection scope of the utility model.

What is claimed is:

1. An LED module mounting mechanism, comprising:
a fixing frame,
at least one gap adjusting mechanism mounted on the fixing frame, and
at least two moving blocks movably connected with the fixing frame,
wherein the LED modules are arranged on the moving blocks; two ends of the gap adjusting mechanism are connected with the moving blocks respectively; a gap between the LED modules arranged on the moving blocks is adjusted by moving the moving blocks on the two ends toward or away from each other; and
wherein, a surface of each of the movable blocks facing to the fixing frame is formed with at least one projection, a corresponding part of the fixing frame is provided with a recess, the projection is movably engaged in the recess.

2. An LED module mounting mechanism, comprising:
a fixing frame,
at least one gap adjusting mechanism mounted on the fixing frame, and
at least two moving blocks movably connected with the fixing frame, wherein the LED modules are arranged on the moving blocks; two ends of the gap adjusting mechanism are connected with the moving blocks respectively; a gap between the LED modules arranged on the moving blocks is adjusted by moving the moving blocks on the two ends toward or away from each other; and
wherein:
the fixing frame comprises a horizontal frame and a vertical frame, an extending direction of the horizontal frame is defined as X-axis direction and the extending direction of the vertical frame is defined as Y-axis direction;
the number of the moving blocks is four, the four moving blocks are respectively disposed on two sides of the horizontal frame and two sides of the vertical frame, and show a grid pattern, the moving blocks disposed on the two ends of the horizontal frame are movable along the X-axis direction and the moving blocks disposed on the two ends of the vertical frame are movable along the Y-axis direction, each LED module is mounted on one movable block; and
the number of the gap adjusting mechanisms is at least three, the at least three gap adjusting mechanisms are respectively mounted on the horizontal frame and the vertical frame, two ends of each gap adjusting mechanism are connected to two moving blocks respectively, the gap between two LED modules arranged on the moving blocks is adjusted by moving the two moving blocks on the two ends toward or away from each other, wherein the gap adjusting mechanism mounted on the horizontal frame is a Y-axis adjustment mechanism, the gap adjusting mechanism mounted on the vertical frame is an X-axis gap adjusting mechanism, wherein the Y-axis gap adjusting mechanism is mounted on the horizontal frame in a manner capable of integrally moving along the X-axis direction, and the X-axis gap adjusting mechanism is mounted on the vertical frame in a manner capable of integrally moving along the X-axis direction.

3. The LED module mounting mechanism of claim 2, wherein the horizontal frame is provided with an X-direction strip through hole extending in the longitudinal direction along the X-axis direction, the vertical frame is provided with a Y-direction strip through hole extending in the longitudinal direction along the Y-axis direction, the X-axis gap adjusting mechanism is movably disposed within the Y-direction stripe through hole and two ends of the X-axis gap adjusting mechanism extend out of the Y-direction stripe through hole and are respectively connected to left and right movable blocks, such that the two movable blocks are capable of being driven to move toward or away from each other along the X-axis direction; and the Y-axis gap adjusting mechanism is movably disposed within the X-direction stripe through hole and two ends of the Y-axis gap adjusting mechanism extend out of the X-direction stripe through hole and are respectively connected to upper and lower movable blocks, such that the two movable blocks are capable of being driven to move toward or away from each other along the Y-axis direction.

4. The LED module mounting mechanism of claim 3, wherein the gap adjusting mechanism is an adjusting screw of which two ends are provided with screw threads, the X-axis gap adjusting mechanism is an X-axis adjusting screw, the Y-axis gap adjusting mechanism is a Y-axis adjusting screw, a side surface of the movable block facing to the X-axis adjusting screw is provided with an X-axis screw hole adapted to be connected to the X-axis adjusting screw in a threaded connection manner, and a side surface of the movable block facing to the Y-axis adjusting screw is provided with a Y-axis screw hole adapted to be connected to the Y-axis adjusting screw in threaded connection manner.

5. The LED module mounting mechanism of claim 4, wherein the X-axis adjusting screw comprises a X-axis adjusting portion and two X-axis threaded portions fixedly connected to two sides of the X-axis adjusting portion, the thread directions of the two X-axis threaded portions are opposite, the two X-axis threaded portions are respectively connected to the X-axis screw holes on two sides of the X-axis adjusting screw, the thread direction of the X-axis screw holes are matched with the corresponding X-axis threaded portion; the Y-axis adjusting screw comprises a Y-axis adjusting portion and two Y-axis threaded portions fixedly connected to two sides of the Y-axis adjusting portion, the thread directions of the two Y-axis threaded portions are opposite, the two Y-axis threaded portions are respectively connected to the Y-axis screw holes on two sides of the Y-axis adjusting screw, the thread direction of the Y-axis screw holes are matched with the corresponding Y-axis threaded portion.

6. The LED module mounting mechanism of claim 5, wherein the fixing frame is detachable and is formed by fastening a first fixing frame and a second fixing frame, the X-axis adjusting screw and the Y-axis adjusting screw are disposed between the first fixing frame and the second fixing frame, a part of the first fixing frame or the second fixing frame corresponding to the X-axis adjusting screw is provided an opening extending in the longitudinal direction along the Y-axis direction, and a part of the first fixing frame or the second fixing frame corresponding to the Y-axis adjusting screw is provided with an opening extending in the longitudinal direction along the X-axis direction, at least a part of the X-axis adjusting portion and at least a part of the Y-axis adjusting portion are respectively arranged in the corresponding opening, two longer opposite side walls of each opening limit the part of the X-axis adjusting portion located therein or the part of the Y-axis adjusting portion located therein to limit the X-axis adjusting portion or the Y-axis adjusting portion.

7. The LED module mounting mechanism of claim 6, wherein an outer circumference wall of the X-axis adjusting portion is provided a plurality of X-axis adjusting holes which are to be inserted by a tool to rotate the X-axis adjusting screw; the outer circumference wall of the Y-axis adjusting portion is provided a plurality of Y-axis adjusting holes which are to be inserted by the tool to rotate the Y-axis adjusting screw.

8. An LED module mounting mechanism, comprising:
a fixing frame,
at least one gap adjusting mechanism mounted on the fixing frame, and
at least two moving blocks movably connected with the fixing frame, wherein the LED modules are arranged on the moving blocks; two ends of the gap adjusting mechanism are connected with the moving blocks respectively; a gap between the LED modules arranged on the moving blocks is adjusted by moving the moving blocks on the two ends toward or away from each other; and
wherein the direction perpendicular to the plane of the LED modules mounted on the movable blocks is defined as the Z-axis direction, the LED module mounting mechanism further comprises a Z-axis adjusting mechanism mounted in the movable block, corners of the LED module is correspondingly provided with a Z-axis cooperating mechanism, the Z-axis adjusting mechanism cooperate with the Z-axis cooperating mechanism of the LED module to adjust the LED module to move toward or away from the movable block along the Z-axis direction.

9. The LED module mounting mechanism of claim 8, wherein a mounting hole extending along the Z-axis direction is formed on the movable block, the Z-axis adjusting mechanism is a Z-axis adjusting screw axially limited in the mounting hole, the Z-axis cooperating mechanism is a Z-axis adjusting bolt formed on corner of the LED module, the Z-axis adjusting screw is connected to the Z-axis adjusting bolt formed on corner of the LED module.

10. The LED module mounting mechanism of claim 9, wherein each of the movable block is provided with at least one positioning column extending in a longitudinal direction along the Z-axis direction, the corner of the LED module to be connected to the corresponding movable block is provided with at least one positioning hole adapted to be inserted by the positioning column, the positioning column is capable of being inserted into the positioning holes.

11. The LED module mounting mechanism of claim 10, wherein a step is formed on an inner wall of the mounting hole, an annular projection is formed on a head of the Z-axis adjusting screw adapted to be screwed by tools, a side of the annular projection abuts against the step, the other side of the annular projection is provided with a limiting block, the Z-axis adjusting screw and the limiting block are axially limited in the mounting hole by the step-and the limiting block.

* * * * *